Figure 1:
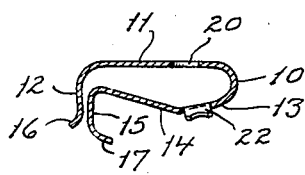

April 11, 1944.    G. A. TINNERMAN    2,346,200
FASTENING DEVICE
Filed March 10, 1943

INVENTOR.
George A. Tinnerman,
BY Dalis, Tear Me Dean
Attorneys.

Patented Apr. 11, 1944

2,346,200

UNITED STATES PATENT OFFICE 2,346,200

FASTENING DEVICE

George A. Tinnerman, Cleveland, Ohio, assignor to Tinnerman Products, Inc., Cleveland, Ohio, a corporation of Ohio Application March 10, 1943, Serial No. 478,608

11 Claims. (Cl. 85—36)

This invention relates to a fastening device adapted for ready mounting on a support having a projecting flange as, for instance, a stringer, beam or other structural member. Such stringers, particularly those employed as longerons in airplane work, are frequently in the form of rolled metal bars having a web with a projecting flange, such flange being frequently stiffened by an edge rib. It is desirable to be able to clamp to such structures various members, as conduits or a bundle of wires or other devices, and to hold such members in place where they cross the projecting support or extend along it.

It is undesirable to drill holes through the web or free flange of the support to attach a bracket, as it weakens the drilled part and causes delay and expense in drilling, and there is also difficulty in locating the spot where the hole should be made for attaching the fastening device. The present invention obviates the disadvantages of drilling the structure and attaching a bracket, by providing a spring metal clip doubled on itself to provide two legs formed in a peculiar manner to engage the exposed face of the support flange and the edge of the reinforcing rib and also to engage opposite faces of the web of the supporting bar. This provides a bracket which when mounted extends at an angle to the web of the bar, and may have the device to be secured attached to the projecting portion of the bracket.

To bind such bracket tightly on the supporting bar, and prevent its being displaced by shifting lengthwise thereof, I provide registering openings in the two legs of the doubled clip through which a bolt may pass to force said legs toward each other and thus clamping the supporting flange with its reinforcing rib tightly between the legs of the clip. The same bolt or screw which effects this forcing action may also attach the article to be secured, or a clamp embracing it, to the doubled clip.

The flanges of the supporting beams frequently vary in their dimensions and extent, and the edge ribs also vary in their location and the amount which they project. It is a feature of my fastening device that it is formed to clamp on such varying supports. I effect this by inclining the under leg of the clip which engages the edge of the rib so that it may be able to coact with ribs variously located or projecting varying amounts from the top flange which the other leg of the clip engages.

My fastening device is more fully explained hereinafter in connection with a detailed description of the embodiment illustrated in the drawing.

Figure 2:
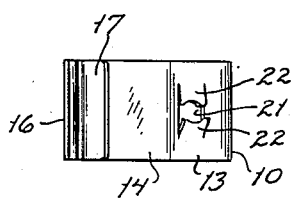
Figure 3:
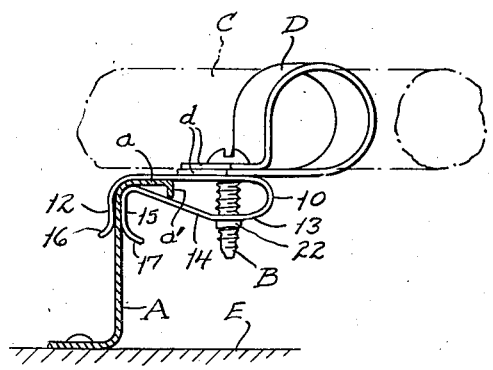
Figure 4:
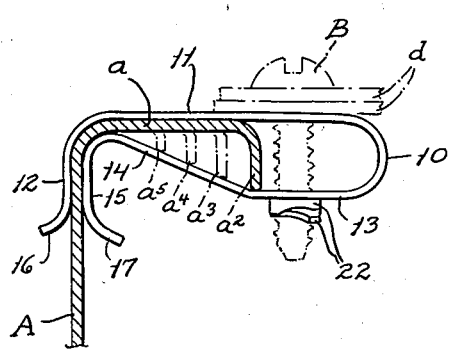

In the drawing, Fig. 1 is a cross section of the fastening device; Fig. 2 is a bottom plan thereof; Fig. 3 is a section through a supporting bar showing my clip in edge elevation, and showing also an article attached by an embracing clamp and screw to the clip; Fig. 4 is an enlargement of a portion of Fig. 3, illustrating the application of the fastener to flanges and ribs of various extent.

As shown in the drawing, my fastening device comprises a single strip of spring sheet metal doubled on itself to present what may conveniently be called an upper intermediate leg and a lower intermediate leg connected by a return bend, each of these intermediate legs having projecting free legs which may embrace the web of the supporting bar, while the intermediate leg portions clamp the flange and its edge rib.

Referring to the parts by reference numerals, 10 indicates the return bend of the clip, 11 the intermediate portion of the upper leg, and 12 the depending or free portion thereof. The return bend makes approximately a semi-circle and leads to the lower leg which is composed of two flat portions 13 and 14 which lie at an oblique angle to each other. The part 13 merges with the return bend 10 and the opposite end of the part 14 is turned down to form the free leg 15. The ends of the legs 12 and 15 are bent in opposite directions, as indicated at 16 and 17, to provide camming surfaces enabling the free legs to be spread when the fastening device is shoved into place across the ribbed edge of the support.

Through the upper leg 11, I form a bolt opening 20, and in the portion 13 of the lower leg, a bolt opening 21. I distort the material of the lower leg about the opening 21 to form a helical edge constituting a screw thread. As shown, the deformation is effected by making two slits at the opposite edges of the opening 21, providing two tongues 22 which are bent at an acuate angle to the portion 13 of the lower leg and have their ends notched and the material warped to provide a helical edge, providing a screw thread.

As shown in Fig. 3, A indicates a supporting beam having a projecting flange a with the edge downturned to make the reinforcing rib a'. The fastening device as described coacts to engage such supporting beam in the manner shown, that is to say the top leg 11 engages the outer face of the flange a while the outer downward leg 12 engages the web of the beam on one side, and the under leg engages the edge of the projecting flange a' and extends diagonally upwardly behind it into engagement with the under surface of the flange a where it curves into the web of the beam, the downward free leg portion 15 of the under leg engaging the inner face of the web. This makes a firm attachment to the supporting beam providing an effective lateral extension of the top flange for attachment of the device to be secured.

As heretofore stated, I prevent the longitudinal shifting of the fastening device along the supporting beam by positively clamping its upper and under legs against opposite faces of the flange and projection of the beam. Figs. 3 and 4 show a screw B for this purpose, this screw passing through the opening 20 of the upper leg and passing between the tongues 22 of the lower leg and threadingly engaging warped ends thereof. This same clamping screw may also serve to attach the member to be secured to the fastening device. This is indicated in Fig. 3 where C indicates a conduit or bundle of wires or any article to be attached, and D a clamp surrounding the same and having a pair of projecting arms d which overlie each other and have openings through which the screw B passes.

An advantage of my fastening device is that the screw is accessible from the outer space and thus may readily attach the clamp or other article to the fastening device, the screw passing through the clamp arms and fastener legs into an idle space alongside of the supporting beam. This system of mounting also allows the clamp to be readily loosened whenever desired, either to shift the article in the clamp or shift the fastening device along the supporting beam.

In Fig. 4, I have illustrated the binding effect of my fastening device on supports having flanges of different extent. Thus, as shown in full lines, the flange a is of considerable width and the downturned edge a—2 forming the rib is of such length that it is adapted to be engaged by the lower leg where the flat portion 13 joins the portion 14. In such case the portion 13 is substantially parallel with the top portion 11 when the fastening is clamped. However, the same fastener could be mounted on flanges of less width having downturned edges of less extent as indicated by the ribs a—3, a—4, and a—5, of different extent and depending from flanges of different width, any of which ribs may be engaged by the inclined portion 14 of the lower leg. The suggested rib a—4 of Fig. 4 has substantially the position and extent of the rib a' of Fig. 3.

My fastener is adapted for economical manufacture, is easily applied to supporting members of various form by being simply shoved into place, the flaring ends camming the free legs apart to pass over the projecting reinforcement. The fastener may, if desired, be shifted lengthwise of the supporting beam into the location required and is ready for the attachment of the article or an embracing clamp. When the screw has been inserted effecting such attachment the same action binds the fastener definitely in place on the supporting beam.

As shown in Fig. 3, the supporting beam A is of Z-bar construction having an inner flange lying against and riveted to a structural member E. It is to be understood, however, that the formation of this portion of the support and its method of attachment are immaterial to the present invention and may be varied as desired.

I claim:

1. The combination with a supporting structure having a web and a flange with a stiffening rib, of a fastening device comprising a strip of spring sheet metal doubled on itself to provide a return bend and an upper intermediate leg engaging said flange and a lower intermediate leg engaging said stiffening rib, the end portion of each intermediate leg being bent downwardly to provide two approximately parallel free legs, engaging opposite faces of said web.

2. A fastening device comprising a strip of spring material doubled on itself by a return bend to provide two intermediate legs and two free legs leading from the intermediate legs and projecting in the same general direction, one of the intermediate legs being itself bent to form two successive portions at an angle to each other, the portion more distant from the return bend being inclined toward the other intermediate leg to coact with ribs of various location or extent on a supporting beam.

3. A fastening device comprising a strip of spring sheet material doubled on itself to provide a return bend and an upper intermediate leg and a lower intermediate leg, the end portion of each intermediate leg being bent downwardly to provide two approximately parallel free legs, the extreme end of each free leg being bent backwardly away from the other free leg to provide camming surfaces, said under leg being bent intermediately to cause the portion which terminates in the free leg to incline normally toward the top portion.

4. A fastening device comprising a strip of spring sheet material doubled on itself to provide a return bend leading to an upper leg and a lower leg, the upper leg being then bent downwardly to provide an outer free leg and the lower leg being bent downwardly to provide an inner free leg, such free legs being approximately parallel to each other, the lower leg being bent intermediately between the return bend and the free leg to cause the portion carrying the free leg to incline upwardly toward the upper leg, the upper and lower legs having registering bolt openings whereby a bolt may be passed through such legs to clamp them against the upper and under face of a flange having an edge rib.

5. A fastening device comprising a strip of spring sheet material doubled on itself to provide a return bend leading to an upper leg and a lower leg, the upper leg being then bent downwardly to provide an outer free leg and the lower leg being bent downwardly to provide an inner free leg, the lower leg being intermediately bent to cause the portion carrying the free leg to incline upwardly toward the upper leg, the upper and lower legs having registering bolt openings and the material about one of the bolt openings being deformed to provide a helical turn whereby such deformed portion may act as a nut for a clamping bolt.

6. The combination of a supporting beam having a web with a projecting flange with an edge rib of a fastening device comprising a strip of spring sheet material doubled on itself to provide an upper intermediate leg adapted to engage the top face of said flange and a free leg adapted to engage one side of the web of such beam, the lower leg formed to engage the extreme edge of the downward rib and extending beyond the same into engagement with the under face of the flange adjacent the web of the beam, said under leg carrying a free leg which engages that side of the web, the upper and under legs having registering bolt openings, whereby a bolt passing through said openings may clamp the upper leg against the flange and the lower leg against the edge of the projecting rib on the flange.

7. The combination of a support having a web and a projecting flange, the edge of the flange being turned down into substantial parallelism with the web to make a projecting rib, and a fastening device comprising a strip of spring material intermediately doubled on itself to make a return bend leading into an upper and a lower leg, said upper leg engaging the top face of said flange and terminating in a downturned free leg which engages the outer face of the web of the beam, the other end of the return bend merging with the lower leg which extends approximately parallel with the top intermediate leg and then inclines upwardly into engagement with the flange adjacent the web and carries a downturned free leg engaging the inner face of the web, and a screw passing through registering openings in the upper and under legs beyond the engaged rib of the support and operating to bind the fastener legs against the under face of the rib and the upper face of the flange.

8. A fastening device comprising a strip of spring material doubled on itself to provide two intermediate legs and two free legs leading from the free ends of the intermediate legs and projecting therefrom in the same general direction and at an angle thereto, one of the intermediate legs being itself bent to form two portions at an angle to each other, one of said portions being substantially parallel to the other intermediate leg and the other of said portions extending obliquely to said other intermediate leg, and registering bolt openings in the said substantially parallel portion and in said other intermediate leg.

9. A fastening device adapted to be clamped on a flange having a stiffening rib comprising a strip of resilient sheet material doubled on itself by a return bend and providing one leg adapted to engage the face of the flange opposite the rib and another leg having a portion inclining toward the first leg and adapted to extend across said rib, each of said legs having portions substantially parallel with each other and provided with registering openings, the material of one of the legs being deformed about the opening therethrough to provide a helical edge to engage the thread of a screw passing through the openings.

10. The combination, with a supporting structure having a flange and a stiffening rib, of a fastening device comprising a strip of spring sheet material doubled on itself by a return bend providing one leg with a portion engaging the face of the flange opposite the stiffening rib and another leg diverted toward the first-mentioned leg and engaging the stiffening rib, portions of the two legs being substantially parallel and having registering openings and a clamping screw occupying such openings.

11. A fastening device comprising a strip of of spring material doubled on itself to provide two intermediate legs and two free legs leading from the intermediate legs and projecting therefrom in the same general direction at an angle thereto and standing with their faces directly opposite each other to embrace a member between them, one of the intermediate legs being itself bent to form two portions at an angle to each other, one of which portions is substantially parallel to the other intermediate leg, the substantially parallel portions being provided with registering openings and the material of one of the legs adjacent its opening being deformed to provide a thread engager, for a screw passing through said openings.

GEORGE A. TINNERMAN.